United States Patent
Voyer

(10) Patent No.: US 10,052,971 B2
(45) Date of Patent: Aug. 21, 2018

(54) METHOD AND DEVICE FOR CONTROLLING VOLTAGE OF CATENARY SUPPLYING ELECTRIC POWER TO ROLLING STOCKS

(71) Applicant: MITSUBISHI ELECTRIC CORPORATION, Tokyo (JP)

(72) Inventor: Nicolas Voyer, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 265 days.

(21) Appl. No.: 15/101,711

(22) PCT Filed: Jan. 16, 2015

(86) PCT No.: PCT/JP2015/051746
§ 371 (c)(1),
(2) Date: Jun. 3, 2016

(87) PCT Pub. No.: WO2015/111678
PCT Pub. Date: Jul. 30, 2015

(65) Prior Publication Data
US 2016/0303999 A1    Oct. 20, 2016

(30) Foreign Application Priority Data

Jan. 23, 2014 (EP) .................... 14152302

(51) Int. Cl.
*B60M 3/02* (2006.01)
*B60L 1/00* (2006.01)
(Continued)

(52) U.S. Cl.
CPC ............... *B60M 3/02* (2013.01); *B60L 1/003* (2013.01); *B60L 1/08* (2013.01); *B60L 5/24* (2013.01);
(Continued)

(58) Field of Classification Search
CPC .. B60M 3/00; B60M 3/02; B60M 3/04; B60L 1/00; B60L 1/003; B60L 1/02; B60L 3/00;
(Continued)

(56) References Cited

U.S. PATENT DOCUMENTS 3,818,296 A    6/1974  Torii
6,371,265 B1 *  4/2002  Arrouy .................. H01H 33/16
                                                            191/2
(Continued)

FOREIGN PATENT DOCUMENTS

DE    10 2008 020 981 A1    10/2009

*Primary Examiner* — Robert J McCarry, Jr
(74) *Attorney, Agent, or Firm* — Birch, Stewart, Kolasch & Birch, LLP

(57) ABSTRACT

The present invention concerns a method and a device for controlling the voltage of a catenary supplying electric power to rolling stocks. The first rolling stock: —detects a traction command or a regeneration command of a second rolling stock in the neighborhood of first rolling stock, —increases the electric power supplied by the first rolling stock to means for heating, ventilation and air conditioning when a regeneration command of the second rolling stock is detected, —decreases the electric power supplied by the first rolling stock to the means for heating, ventilation and air conditioning when a traction command of the second rolling stock is detected.

12 Claims, 4 Drawing Sheets

(51) Int. Cl.
   *B60L 1/08*   (2006.01)
   *B60L 7/18*   (2006.01)
   *B60L 15/38*   (2006.01)
   *B60L 5/24*   (2006.01)

(52) U.S. Cl.
   CPC .............. *B60L 7/18* (2013.01); *B60L 15/38* (2013.01); *B60L 2200/26* (2013.01); *B60L 2240/34* (2013.01); *B60L 2240/527* (2013.01); *B60L 2250/12* (2013.01)

(58) Field of Classification Search
   CPC ...... B60L 3/06; B60L 9/00; B60L 9/02; B60L 9/32; B60L 15/32; B60L 15/40; B60L 15/42
   See application file for complete search history.

(56) References Cited

U.S. PATENT DOCUMENTS

| | | | |
|---|---|---|---|
| 8,013,469 B2 | 9/2011 | Masselus | |
| 8,151,955 B2 | 4/2012 | Aubigny et al. | |
| 2008/0246338 A1* | 10/2008 | Donnelly | B60L 11/123 307/54 |
| 2008/0269009 A1* | 10/2008 | Marr | B60K 6/46 477/3 |
| 2011/0273009 A1* | 11/2011 | Kumar | B60L 1/00 307/9.1 |
| 2012/0296545 A1* | 11/2012 | Cooper | B61C 17/12 701/99 |

\* cited by examiner

METHOD AND DEVICE FOR CONTROLLING VOLTAGE OF CATENARY SUPPLYING ELECTRIC POWER TO ROLLING STOCKS

The present invention relates generally to a method and a device for controlling the voltage of a catenary supplying electric power to rolling stocks.

An electrified Railway system is connected to Public grid via substations. Substations convert electric power from/to the Public grid to/from a catenary. The catenary conveys electric power to/rolling stocks via pantographs of a rolling stock.

Catenary is also used to carry power of auxiliary systems, such as HVAC (Heating, Ventilation, Air Conditioning), supply of control systems, communication, compressor for air brakes/pantograph, etc. Power consumed by HVAC is typically determined according to climatic conditions of the rolling stock, in order to maintain a constant comfort temperature for passengers, and variations of these heat conditions are typically slow.

Recovery of braking energy is key to reduce energy consumption of railway systems.

Rolling stocks equipped with electric motor drives and pantograph can benefit from electromagnetic brake, and can convert braking power into electric power. This power can then be fed to the catenary system and be consumed by surrounding rolling stocks or might be fed back to the grid by surrounding substations.

Due to voltage drop in the catenary, the catenary voltage increases in the vicinity of rolling stock when the rolling stock injects regenerative power on the catenary. To avoid overvoltage, rolling stocks have to implement current squeezing. When voltage gets too high, part of power regenerated by the motor drive is fed to local rheostat, and only a portion of regenerated power is injected to the catenary. As a result, a significant part of regenerative power can be lost as heat dissipated in rheostat during braking.

Current squeezing is also essential to consume the excess of braking powers compared to consumption powers in the line. The problem is very severe in case the substations can't feed power back to the grid. Most DC systems are not equipped with reversible substations, because Grid is not designed to cope with massive injection of current from railway systems. Such injection could cause instability to the Grid operation and is forbidden by regulation in most countries.

For electrified railway systems equipped with non-reversible substations, without on-board or wayside storage systems, excess braking power consumed in rheostat due to squeezing can represent high losses, such as 30% of total power consumption of the line.

The present invention aims at reducing the level of rheostatic losses in electrified railway systems.

To that end, the present invention concerns a method for controlling the voltage of a catenary supplying electric power to rolling stocks, characterized in that the method comprises the steps executed by a first rolling stock of:
  detecting a traction command or a regeneration command of a second rolling stock in the neighborhood of first rolling stock,
  increasing the electric power supplied by the first rolling stock to means for heating, ventilation and air conditioning when a regeneration command of the second rolling stock is detected,
  decreasing the electric power supplied by the first rolling stock to the means for heating, ventilation and air conditioning when a traction command of the second rolling stock is detected.

The present invention concerns also a device for controlling the voltage of a catenary supplying electric power to rolling stocks, characterized in that the device is included in a first rolling stock and comprises:
  means for detecting a traction command or a regeneration command of a second rolling stock in the neighborhood of first rolling stock,
  means for increasing the electric power supplied by the first rolling stock to means for heating, ventilation and air conditioning when a regeneration command of the second rolling stock is detected,
  means for decreasing the electric power supplied by the first rolling stock to the means for heating, ventilation and air conditioning when a traction command of the second rolling stock is detected.

Thus, when the second rolling stock commands a regeneration, higher part of regenerated power is consumed by the first rolling stock. As a result, the voltage of catenary at pantograph of the first rolling stock is decreased and the catenary voltage is better stabilised. As a result, the second rolling stock reduces the level of current squeezing, and less regeneration power is burnt in rheostat of the second rolling stock.

Furthermore, when the second rolling stock commands a traction, the power consumed by the first rolling stock is reduced. As a result, the voltage of catenary at the pantograph of the first rolling stock is increased and the catenary voltage is better stabilised. As a result, the second rolling stock can consume higher traction power.

According to a particular feature, the electric power supplied by the first rolling stock to means for heating, ventilation and air conditioning is increased to a first power value higher than a second power value which is supplied by the first rolling stock to means for heating, ventilation and air conditioning prior the detecting of the regeneration command.

Thus, the power consumed by the means for heating, ventilation and air conditioning is increased and the second rolling stock reduces the level of current squeezing and less regeneration power is burnt in rheostat of second rolling stock.

According to a particular feature, the electric power supplied by the first rolling stock to means for heating, ventilation and air conditioning is decreased to a third power value lower than the second power value.

Thus, the power consumed by the means for heating, ventilation and air conditioning is decreased. The voltage of the catenary at pantograph of the first rolling stock is increased and the catenary voltage is better stabilised. As a result, the second rolling stock can consume higher traction power.

According to a particular feature, the first, second and third power values are determined from an average power value and a power value which is supplied by the first rolling stock to means for heating, ventilation and air conditioning prior the detecting of the traction or the regeneration command.

Thus, the average power value supplied to means for heating, ventilation and air conditioning can be steered to the power level of means for heating, ventilation and air conditioning required to insure good transportation conditions of passengers in absence of the detection of a traction or a regeneration commands of surrounding second rolling stocks. The temperature and quality of air inside the rolling stock cabin are maintained in spite of fast variations of power of means of heating, ventilation and air conditioning resulting from the present invention.

According to a particular feature, the second power value is the maximum power level which can be consumed by means for Heating, Ventilation and Air Conditioning.

Thus, when the first power level is set to the maximum power level of the means for heating, ventilation and air conditioning, the part of power regenerated by the second rolling stock and consumed by the first rolling stock is maximised, and regenerated power burnt in rheostat of the second rolling stock is minimised. According to a particular feature, the third power value is the minimum power level which can be consumed by means for Heating, Ventilation and Air Conditioning.

Thus, the traction power of second rolling stock is maximised.

According to a particular feature, the first power value is the minimum power level which can be consumed by means for Heating, Ventilation and Air Conditioning if the estimated average power level is higher than a target power level, or is determined as the maximum power level which can be consumed by means for Heating, ventilation and Air conditioning if the estimated average power level is lower than the target power level.

Thus, when the average power is higher than the target power and in absence of traction or regeneration command of second rolling stocks, the first rolling stock applies the minimum power and reduces the average power. If the average power is lower than the target, the maximum power is supplied to HVAC, effecting in raising the average power towards the target power level. The average power can be steered to the target power level.

According to a particular feature, the step of detecting of the traction command or the regeneration command further comprises steps of
monitoring the voltage on the catenary,
detecting a traction command when the monitored voltage is lower than a first threshold,
detecting a regeneration command when the monitored voltage is higher than a second threshold.

Thus, the detection of regeneration or traction command by second rolling stock can be implemented in first rolling stock without need for involvement of second rolling stock and without communication interface. When the second rolling stock starts regeneration, the voltage of catenary increases in the vicinity of the second rolling stock. Any first rolling stock able to absorb some excess power from the second rolling stock also sees its pantograph voltage increase and can detect such regeneration command.

According to a particular feature, the detecting of the traction command or the regeneration command is performed by receiving a message from a dispatcher.

Thus, the dispatcher can order the first rolling stock to increase its consumption power even when pantograph voltage is low. Rolling stocks located away from the second rolling stock can contribute to the reduction of power consumed in rheostat of the second rolling stock. Reversely, the dispatcher can order the first rolling stock to decrease its consumption power even when the pantograph voltage is high. Rolling stocks located away from the second rolling stock can contribute to the increase of traction power of the second rolling stock.

According to a particular feature, the method comprises further step of transferring a message to the dispatcher if the traction command or the regeneration command of the second rolling stock is detected.

Thus, the dispatcher is informed by the second rolling stock of any traction or regeneration command and can determine that a set of first rolling stocks should reduce or increase its HVAC power.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of example embodiments, the said description being produced with reference to the accompanying drawings, among which:

Figure 6:
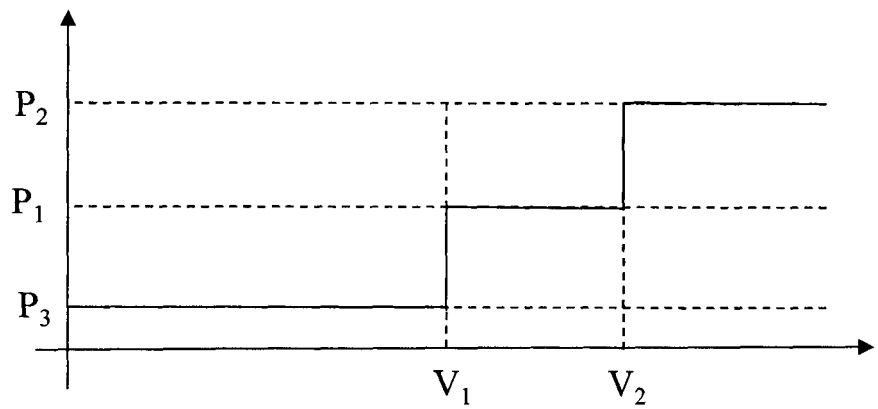
Figure 7:
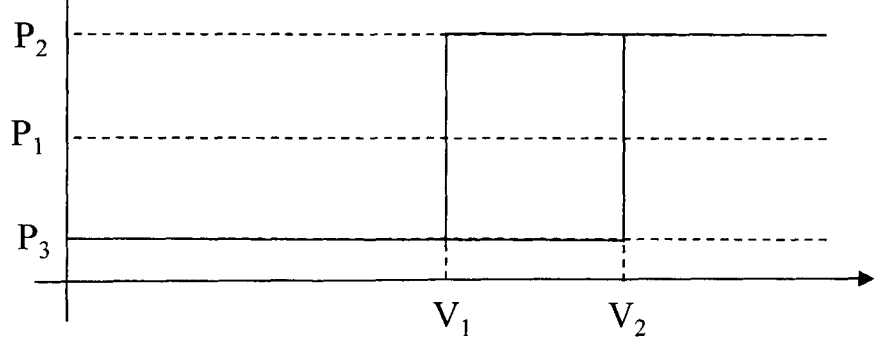
Figure 3:
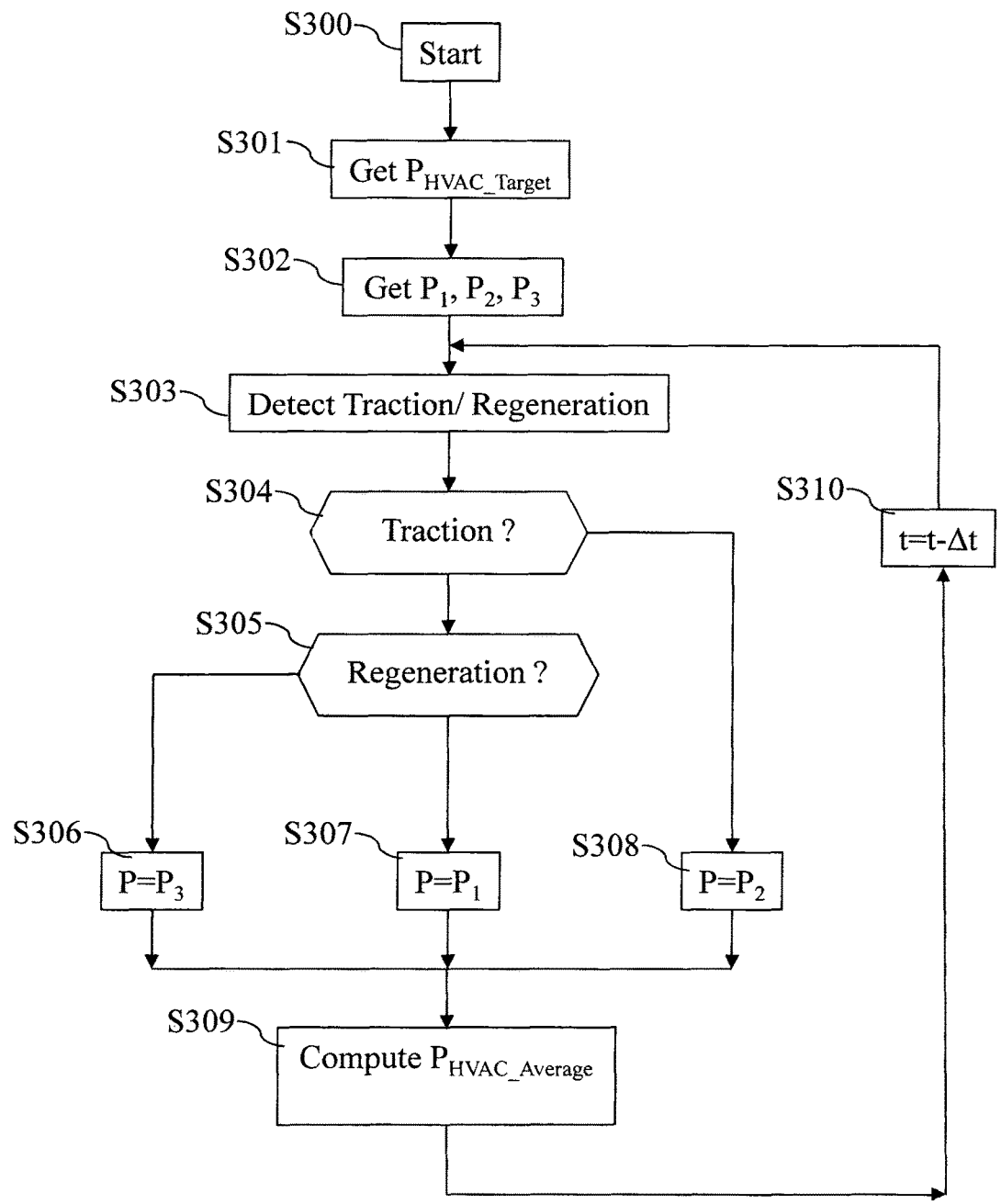
Figure 4:
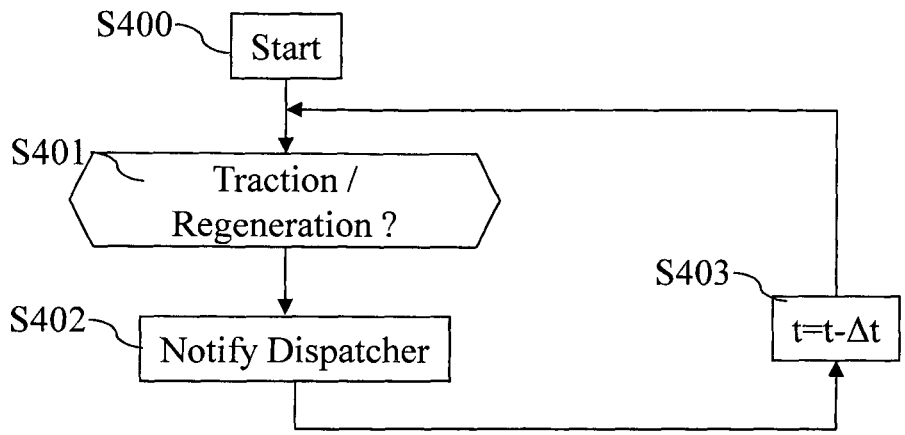
Figure 5:
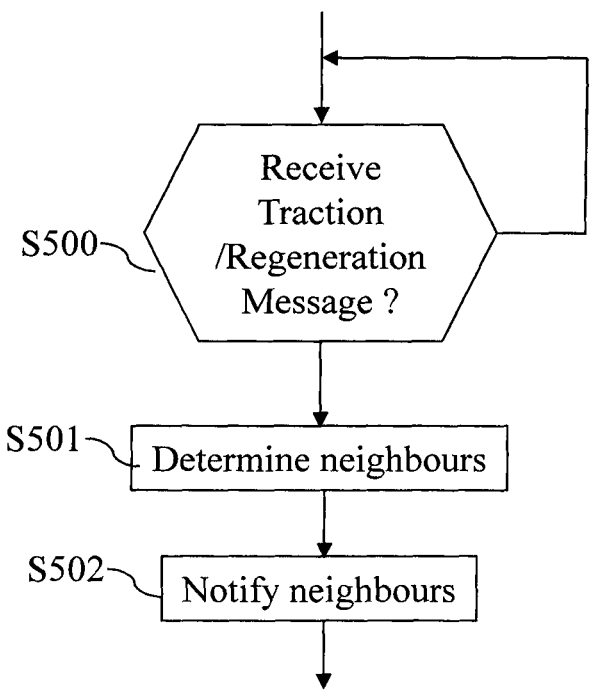

FIG. 3 discloses an algorithm executed by a rolling stock and neighbouring rolling stocks according to a first and second modes of realization of the present invention;

FIG. 4 discloses an algorithm executed by a rolling stock according to the second mode of realization of the present invention;

FIG. 5 discloses an algorithm executed by a dispatcher according to the second mode of realization of the present invention;

FIG. 6 discloses a first example of a curve for determining the electric power to be provided to HVAC according to voltage catenary;

FIG. 7 discloses a second example of a curve for determining the electric power to be provided to HVAC according to voltage catenary.

Figure 1:
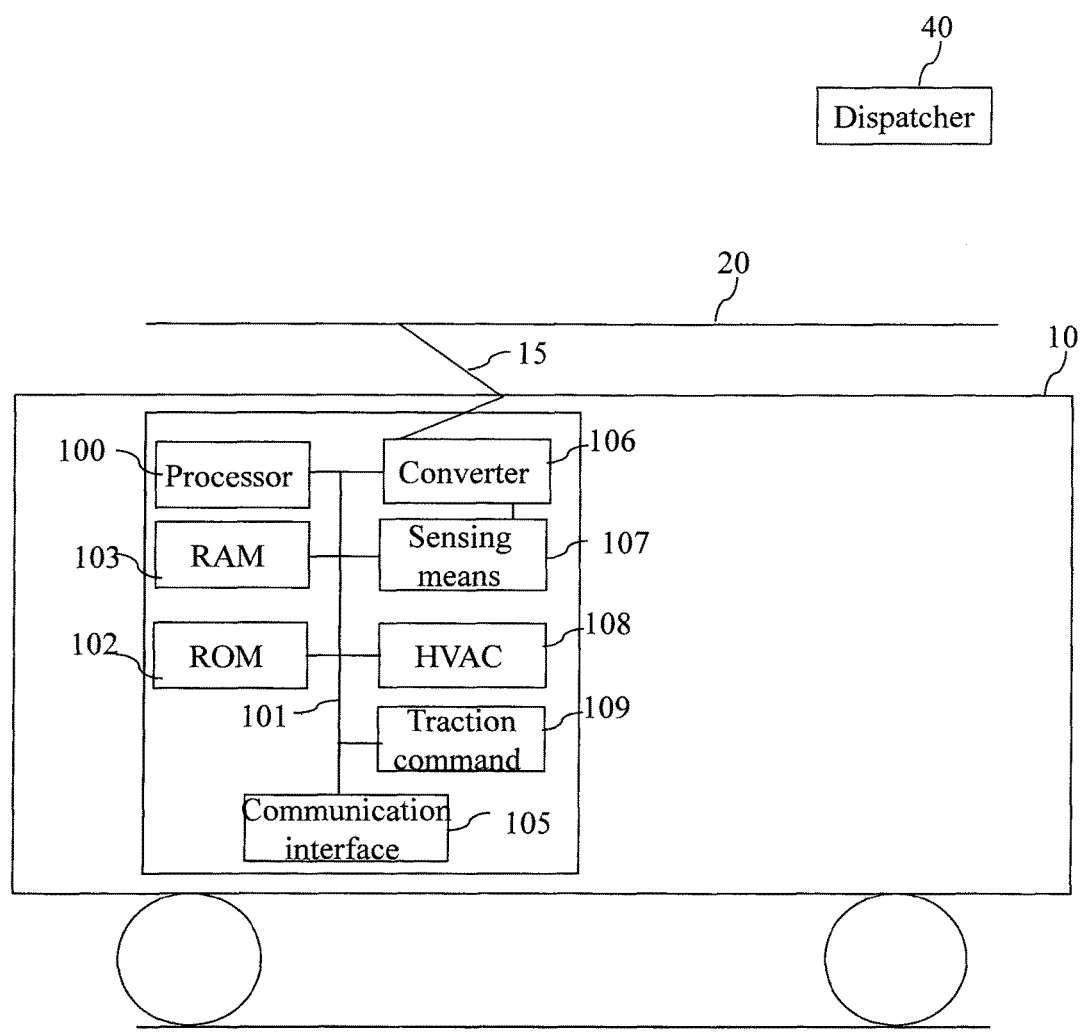
FIG. 1 represents a rolling stock in a system in which the present invention is implemented.

FIG. 1 represents a rolling stock in a system in which the present invention is implemented.

In FIG. 1, a rolling stock 10 is shown. The rolling stock 10 has a pantograph 15 which links the rolling stock 10 to a catenary 20.

According to the second mode of realization of the present invention, the system comprises a dispatcher 40.

The rolling stock 10 comprises a device for controlling the voltage of a catenary supplying electric power to rolling stocks. The device for controlling the voltage of the catenary supplying electric power to rolling stocks has, for example, an architecture based on components connected together by a communication bus 101 and a processor 100 controlled by the programs as disclosed in FIGS. 3, 4 and 6.

The communication bus 101 links the processor 100 to a read only memory ROM 102, a random access memory RAM 103, a communication interface 105, electric power conversion means 106, the HVAC system 108 and according to different modes of realization of the present invention, a communication interface 105, catenary voltage sensing means 107 and traction command sensing means 109.

The memory 103 contains registers intended to receive variables and the instructions of the programs related to the algorithms as disclosed in FIGS. 3 and 4.

The read only memory 102 contains instructions of the programs related to the algorithms as disclosed in FIGS. 3 and 4, which are transferred, when the device for controlling the voltage of a catenary supplying electric power to rolling stocks is powered on, to the random access memory 103.

The device for controlling the voltage of the catenary supplying electric power to rolling stocks comprises, according to the second mode of realization of the present invention, a communication interface 105. For example, the communication interface 105 is a wireless interface or a communication interface enabling communication through the electric power network.

The device for controlling the voltage of the catenary supplying electric power to rolling stocks comprises, according to the first mode of realization of the present invention, catenary voltage sensing means 107 which may detect voltage variations of the catenary 20, traction command sensing means 109 which may sense modification of traction commands.

Any and all steps of the algorithms described hereafter with regard to FIGS. 3 and 4 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the device for controlling the voltage of the catenary supplying electric power to rolling stocks includes circuitry, or a device including circuitry, causing the device for controlling the voltage of a catenary supplying electric power to rolling stocks to perform the steps of the algorithms described hereafter with regard to FIGS. 3 and 4.

According to the invention, the device for controlling the voltage of the catenary supplying electric power to rolling stocks comprises:
  means for detecting a traction command or a regeneration command of a second rolling stock in the neighborhood of first rolling stock,
  means for increasing the electric power supplied by the first rolling stock to means for heating, ventilation and air conditioning when a regeneration command of the second rolling stock is detected,
  means for decreasing the electric power supplied by the first rolling stock to the means for heating, ventilation and air conditioning when a traction command of the second rolling stock is detected.

Figure 2:
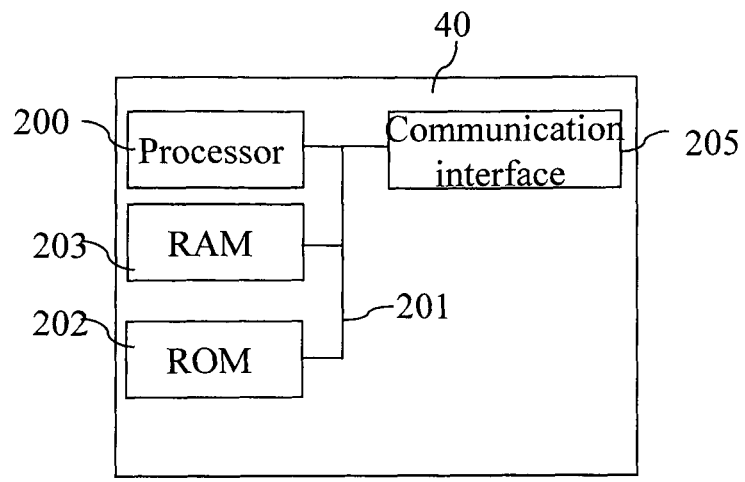
FIG. 2 is a diagram representing the architecture of a dispatcher in which the present invention, according to a second mode of realization, is implemented.

FIG. 2 is a diagram representing the architecture of a dispatcher in which the present invention, according to a second mode of realization, is implemented.

The dispatcher 40 has, for example, an architecture based on components connected together by a bus 201 and a processor 200 controlled by the program as disclosed in FIG. 5.

The bus 201 links the processor 200 to a read only memory ROM 202, a random access memory RAM 203 and a communication interface 205.

The memory 203 contains registers intended to receive variables and the instructions of the program related to the algorithm as disclosed in FIG. 5.

The processor 200 controls the operation of the communication interface 205.

The read only memory 202 contains instructions of the program related to the algorithm as disclosed in FIG. 5, which are transferred, when the dispatcher 40 is powered on, to the random access memory 203.

The dispatcher 40 is connected to a communication network through the communication interface 205. For example, the communication interface 205 is a wireless interface or a communication interface enabling communication through the electric power network.

Through the network interface 205, the dispatcher 40 may transfer messages and/or receive messages to/from rolling stocks.

Any and all steps of the algorithm described hereafter with regard to FIG. 5 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the dispatcher 40 includes circuitry, or a device including circuitry, causing the dispatcher 40 to perform the steps of the algorithms described hereafter with regard to FIG. 5.

FIG. 3 discloses an algorithm executed by a rolling stock and neighbouring rolling stocks according to first and second modes of realization of the present invention.

More precisely, the present algorithm is executed by the processor 100.

At step S300, the processor 100 starts the present algorithm.

At next step S301, the processor 100 gets the target power $P_{HVAC\_Target}$ to be provided to the HVAC system. As example, the target power $P_{HVAC\_Target}$ was determined by the HVAC system 108 to meet a comfort temperature level inside the rolling stock 10.

At next step S302, the processor 100 gets power values $P_1$, $P_2$ and $P_3$. The first power value $P_1$ corresponds to a medium power, the second power value $P_2$ corresponds to a high power and the third power value $P_3$ corresponds to a low power. For example, the power value P1 is the target power $P_{HVAC\_Target}$, $P_2$ is the maximum rated power of HVAC system, $P_3$ is the power level required to guarantee correct ventilation inside the rolling stock 10.

At next step S303, the processor 100 checks if a neighbour rolling stock is in traction or in regeneration mode.

According to a first mode of realization of the invention, the processor 100 determines that a neighbour rolling stock is in traction when pantograph voltage sensed by sensing means 107 is below a first voltage value $V_1$. When a neighbour rolling stock accelerates, the electric power needed by the motor drive of the neighbour rolling stock increases, causing a decrease of catenary voltage on catenary due to ohmic losses in the catenary.

According to the first mode of realization of the invention, the processor 100 determines that a neighbour rolling stock is in regeneration when pantograph voltage sensed by sensing means 107 is higher than a second voltage value $V_2$. When a neighbour rolling stock accelerates, the electric power fed to the catenary by the motor drive of the neighbour rolling stock increases, causing an increase of catenary voltage due to ohmic losses in the catenary.

According to a second mode of realization of the invention, the processor 100 determines that a neighbour rolling stock is in traction or in regeneration according to a message received by communication interface 105 from dispatcher 40.

At next step S304, the processor 100 checks if a neighbour rolling stock is in traction mode.

If a neighbour rolling stock is in traction mode, the processor 100 moves to step S308. Otherwise, the processor 100 moves to step S305.

At step S305, the processor 100 checks if a neighbour rolling stock is in regeneration mode.

If a neighbour rolling stock is in regeneration mode, the processor 100 moves to step S306. Otherwise, the processor 100 moves to step S307.

At step S306, the processor 100 sets the power to be provided to the HVAC system 108 to the power value $P_3$. After that, the processor 100 moves to step S309 according to a particular mode of realization or returns to step S303. At step S307, the processor 100 sets the power to be provided to the HVAC system 108 to the power value $P_1$. After that, the processor 100 moves to step S309 according to a particular mode of realization or returns to step S303.

At step S308, the processor 100 sets the power to be provided to the HVAC system 108 to the power value $P_2$. After that, the processor 100 moves to step S309 according to a particular mode of realization or returns to step S303.

At step S309, the processor 100 computes the average power provided to the HVAC system.

The average power $P_{HVAC\_Average}$ is determined by averaging the power to be provided to the HVAC system 108 determined at steps S306, S307, S309 on a sliding window having a duration of few tens seconds. At the same step, the processor 100 checks if the average power $P_{HVAC\_Average}$ is lower than the target power $P_{HVAC\_Target}$.

If the average power $P_{HVAC\_Average}$ is lower than the target power $P_{HVAC\_Target}$, the processor 100 sets the value $P_1$ to the value of $P_3$. If the average power $P_{HVAC\_Average}$ is not lower than the target power $P_{HVAC\_Target}$, the processor 100 sets the value $P_1$ to the value of $P_2$.

After that, the processor 100 moves to step S310 and shifts the sliding window of a time duration equal to $\Delta t$. $\Delta t$ is typically set to few hundreds of milliseconds.

After that, the processor 100 returns to step S303.

FIG. 4 discloses an algorithm executed by a rolling stock according to the second mode of realization of the present invention.

More precisely, the present algorithm is executed by the processor 100.

At step S400, the processor 100 starts the present algorithm.

At next step S401, the processor 100 detects if a traction or regeneration command is requested for the rolling stock.

If a traction or a regeneration command is requested for the rolling stock, the processor 100 moves to step S402, else it returns to step S401.

The traction or regeneration command may be detected through the catenary voltage sensing means 107 or through the traction command sensing means 109.

At next step S402, the processor 100 sends a message to dispatcher 40, via the communication interface 105, indicating that a traction or a regeneration command is detected for the rolling stock or for a neighbouring rolling stock. Then the processor 100 returns to step S401.

FIG. 5 discloses an algorithm executed by a dispatcher according to the second mode of realization of the present invention.

More precisely, the present algorithm is executed by the processor 200.

At step S500, the processor 200 checks if a message indicating that a traction or a regeneration command, detected for a rolling stock, is received from the communication interface 205.

If a message indicating that a traction or a regeneration command, detected for rolling stock, is received from the communication interface 205, the processor 200 moves to step S501. Otherwise, the processor 200 returns to step S500.

At step S501, the processor 200 determines the rolling stocks which are neighbour to the rolling stock which sent the received message.

As example, the dispatcher stores in RAM 203 the running profiles of all rolling stock, indicating positions of all rolling stock over time. At the time of receiving the message at step S500, the position of the emitting rolling stock is determined from the running profile, and compared with position of other rolling stocks.

As a first implementation, rolling stocks are determined to be neighbour when they are supplied by the same catenary sub-segment located between two substations.

As a second implementation, rolling stocks are determined to be neighbour when the distance between rolling stocks is lower than a threshold.

At next step S502, the processor 200 commands the transfer of a message to each rolling determined as neighbour to the rolling stock which sent the received message notifying the rolling stocks that an acceleration or a deceleration, i.e. a traction or a regeneration is being performed by a rolling stock.

After that, the processor 200 returns to step S500.

FIG. 6 discloses a first example of a curve for determining the electric power to be provided to HVAC system according to voltage catenary.

The voltage monitored on catenary is on the horizontal axis and the power to be provided to the HVAC system 108 is on the vertical axis.

If the voltage monitored on catenary is lower than a voltage $V_1$ which is for example equal to 90% of the nominal voltage provided by the catenary, the power provided to the HVAC system 108 is equal to the value $P_3$.

If the voltage monitored on catenary is upper than the voltage $V_1$ and lower than a voltage $V_2$ which is for example equal to 110% of the nominal voltage provided by the catenary, the power provided to the HVAC system 108 is equal to the value $P_1$.

If the voltage monitored on catenary is upper than the voltage $V_2$, the power provided to the HVAC is equal to the value $P_2$.

FIG. 7 discloses a second example of a curve for determining the electric power to be provided to HVAC system according to voltage catenary.

The voltage monitored on catenary is on the horizontal axis and the power to be provided to the HVAC system 108 is on the vertical axis.

If the voltage monitored on catenary is lower than a voltage $V_1$ which is for example equal to 90% of the nominal voltage provided by the catenary, the power provided to the HVAC system 108 is equal to the value $P_3$.

If the voltage monitored on catenary is upper than the voltage $V_1$ and lower than a voltage $V_2$ which is for example equal to 110% of the nominal voltage provided by the catenary, the power provided to the HVAC system 108 is equal to the value $P_3$ or $P_1$ according to the comparison result of $P_{HVAC\_Average}$ and $P_{HVAC\_Target}$ performed at step S309.

If the voltage monitored on catenary is upper than the voltage $V_2$ the power provided to the HVAC is equal to the value $P_2$.

Naturally, many modifications can be made to the embodiments of the invention described above without departing from the scope of the present invention.

The invention claimed is:

1. Method for controlling the voltage of a catenary supplying electric power to rolling stocks, characterized in that the method comprises the steps executed by a first rolling stock of:
   detecting a traction command or a regeneration command of a second rolling stock in the neighborhood of first rolling stock,
   increasing the electric power supplied by the first rolling stock to means for heating, ventilation and air conditioning when a regeneration command of the second rolling stock is detected,
   decreasing the electric power supplied by the first rolling stock to the means for heating, ventilation and air conditioning when a traction command of the second rolling stock is detected.

2. Method according to claim 1, characterized in that the electric power supplied by the first rolling stock to means for heating, ventilation and air conditioning is increased to a first power value higher than a second power value which is supplied by the first rolling stock to means for heating, ventilation and air conditioning prior the detecting of the regeneration command.

3. Method according to claim 2, characterized in that the electric power supplied by the first rolling stock to means for heating, ventilation and air conditioning is decreased to a third power value lower than the second power value.

4. Method according to claim 3, characterized in that the first, second and third power values are determined from an average power value and a power value which is supplied by the first rolling stock to means for heating, ventilation and air conditioning prior the detecting of the traction or the regeneration command.

5. Method according to claim 4, characterized in that the first power value is the minimum power level which can be consumed by means for Heating, Ventilation and Air Conditioning if the estimated average power level is higher than a target power level, or is determined as the maximum power level which can be consumed by means for Heating, ventilation and Air conditioning if the estimated average power level is lower than the target power level.

6. Method according to claim 3, characterized in that the second power value is the maximum power level which can be consumed by means for Heating, Ventilation and Air Conditioning.

7. Method according to claim 3, characterized in that the third power value is the minimum power level which can be consumed by means for Heating, Ventilation and Air Conditioning.

8. Method according to claim 1, characterized in that the step of detecting a traction command or a regeneration command further comprises steps of
   monitoring the voltage on the catenary,
   detecting a traction command when the monitored voltage is lower than a first threshold,
   detecting a regeneration command when the monitored voltage is upper than a second threshold.

9. Method according to claim 1, characterized in that the detecting of the traction command or the regeneration command is performed by receiving a message from a dispatcher.

10. Method according to claim 9, characterized in that the method comprises further step of transferring a message to the dispatcher if the traction command or the regeneration command of the second rolling stock is detected.

11. Method according to claim 1, characterized in that the method comprises further step of transferring a message to the dispatcher if the traction command or the regeneration command of the second rolling stock is detected.

12. Device for controlling the voltage of a catenary supplying electric power to rolling stocks, characterized in that the device is included in a first rolling stock and comprises:
   a processor to execute a program; and
   a memory to store the program which, when executed by the processor, performs processes of,
   detecting a traction command or a regeneration command of a second rolling stock in the neighborhood of first rolling stock,
   means for increasing the electric power supplied by the first rolling stock to means for heating, ventilation and air conditioning when a regeneration command of the second rolling stock is detected,
   decreasing the electric power supplied by the first rolling stock to the means for heating, ventilation and air conditioning when a traction command of the second rolling stock is detected.

* * * * *